United States Patent [19]
Roberts et al.

[11] 3,967,582
[45] July 6, 1976

[54] OPTICAL RADIATION PROTECTION MECHANISM

[75] Inventors: Thomas G. Roberts; Thomas A. Barr, Jr., both of Huntsville, Ala.

[73] Assignee: The United States of America as represented by the Secretary of the Army, Washington, D.C.

[22] Filed: Jan. 2, 1975

[21] Appl. No.: 538,296

[52] U.S. Cl. .................................. 118/5; 118/506; 332/7.51; 350/3
[51] Int. Cl.² ........................................ B05C 3/12
[58] Field of Search ............... 250/352; 118/4, 8, 6, 118/506, 419; 73/190 EW; 350/3, 312, 319; 332/7.51

[56] References Cited
UNITED STATES PATENTS
2,878,716  3/1959  Leonard ........................ 350/319 X

OTHER PUBLICATIONS

*IBM Technical Disclosure Bulletin*, "Laser Safety System," Hayes, vol. 14, No. 9.

*Primary Examiner*—Morris Kaplan
*Attorney, Agent, or Firm*—Nathan Edelberg; Robert P. Gibson; Charles R. Carter

[57] ABSTRACT

A mechanism for the protection of optical glass plates against high energy laser radiation effects. The mechanism includes a water coated or water impregnated film positioned in a manner to shield the optical plates and absorb radiation from an attacking high energy laser source. An automatic means is provided for advancing the film when it experiences a rapid rise in temperature.

2 Claims, 3 Drawing Figures

OPTICAL RADIATION PROTECTION MECHANISM

DEDICATORY CLAUSE

The invention described herein may be manufactured, used and licensed by or for the Government for governmental purposes without the payment to us of any royalties thereon.

BACKGROUND OF THE INVENTION

This invention relates to the field of laser radiation protection. At the present time the optics in tanks and similar vehicles are projected by a fairly thick glass plate. This glass plate is transparent in the visible region of the spectrum but is opaque in the infrared region. Thus when the plate is attacked by a high energy infrared laser, in the order of 100 watts/cm$^2$, the plate will crack or break. No device for protecting these plates from high energy laser radiation through shielding and absorbing radiation is known.

SUMMARY OF THE INVENTION

This invention provides a means for protecting the optical glass plates from the effects of laser radiation. It consists of a mechanism that places a water coated or water impregnated transparent film in position over the glass plate to absorb high energy laser radiation.

This invention may be better understood from the following detailed description taken in conjunction with the accompanying drawing.

DESCRIPTION OF THE PREFERRED EMBODIMENT

Figure 1:
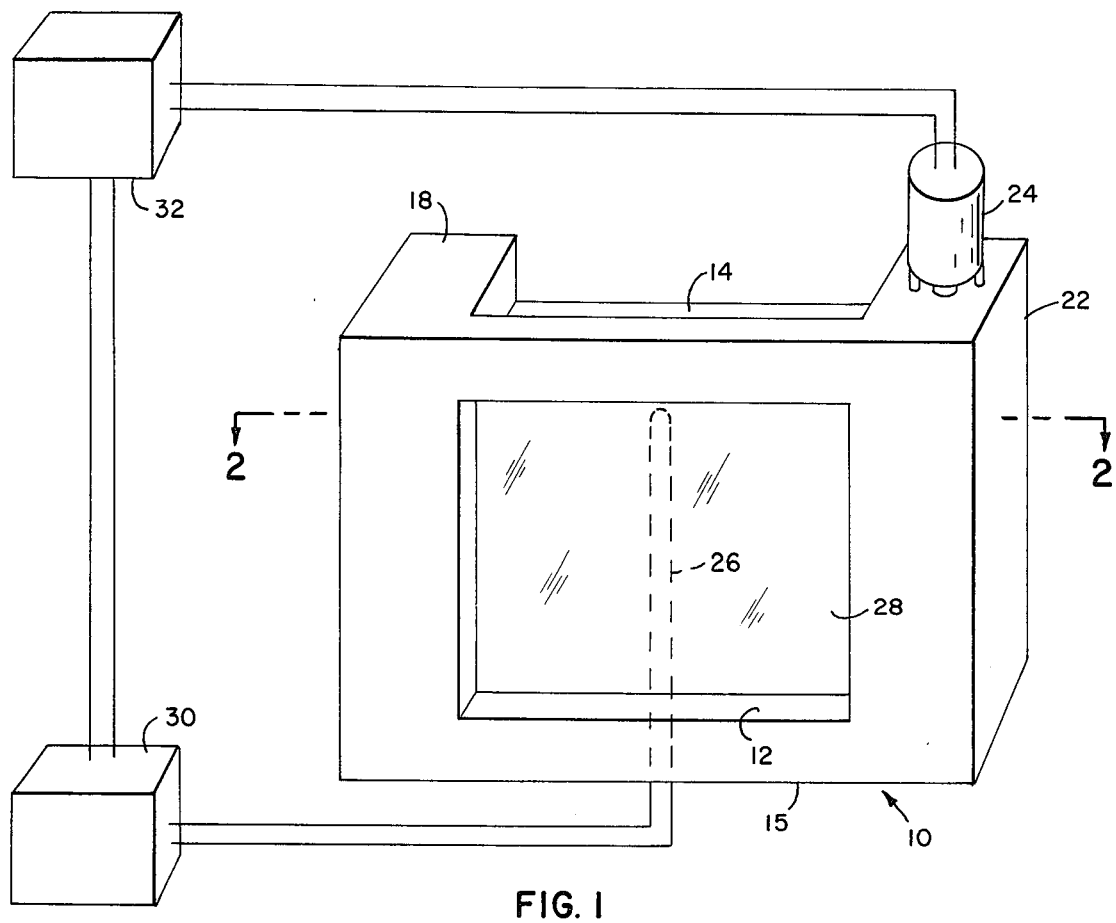
FIG. 1 is a diagrammatic perspective view of the mechanism.
Figure 2:
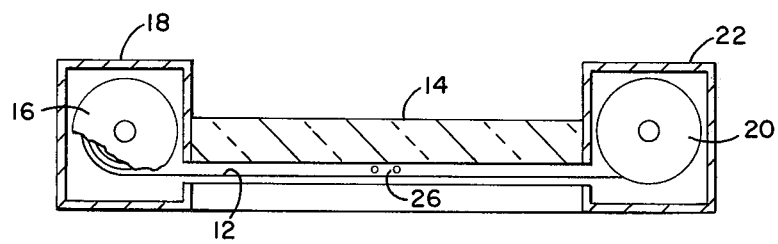
FIG. 2 is a view along line 2—2 of FIG. 1.

In FIGS. 1 and 2, reference numeral 10 generally indicates a laser radiation protection mechanism positioned so that a transparent water impregnated film 12 is shielding optical glass plate 14. The film is carried by a container 15 and feeds from a supply spool 16 located in housing 18 to a take-up reel 20 in housing 22. The take-up reel 20 is operated by a stepping drive motor 24. An automatic film advancing means includes a thermal sensor 26 placed in a window or opening 28 and between the film 12 and glass plate 14. This sensor constitutes one leg of a resistance bridge 30 and the output of the resistance bridge is electronically differentiated. The output signal of bridge 30 is used to control a power supply 32 that operates the stepping motor 24 attached to the film take-up reel 20.

Figure 3:
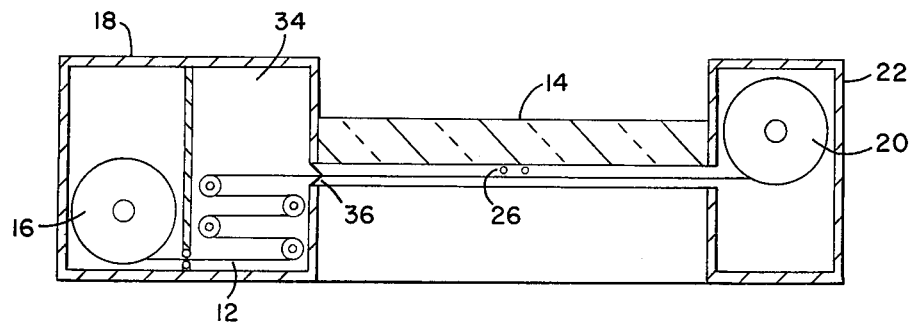
FIG. 3 is a view similar to FIG. 2 showing a modification.

In the embodiment shown in FIG. 3, a liquid reservoir 34 is provided in conjunction with the housing 18. Thus the film 12 would pass through the liquid to be coated before appearing in front of the glass plate. Although water will absorb the radiation from $CO_2$, HF, DF, HCl and CO lasers, the liquid in reservoir 34 may contain a solution of water and some wetting agent. Rubber flaps 36 are used to allow the film 12 to leave the reservoir while keeping the liquid solution therein. This embodiment would be used when film containing an emulsion that must be saturated is used.

The energy required to evaporate one gram of water is in the order of 2500 joules. Thus, the optical glass plate can be protected by a film of either of the above embodiments, which contain a large amount of water, so that more than 10 times additional laser energy would be needed to remove the film before the glass could be attached than it would be if it were unprotected.

The operation of both embodiments is the same in that when the thermal sensor 26 experiences a rapid rise in temperature the bridge 30 is unbalanced. This produces a signal out of the differentiator that causes the power supply to allow the stepping motor to advance the film.

Radiation from the sun varies from about 0.05 to 0.10 watts/cm$^2$, and since the invention is concerned with radiation densities greater than 10 watts/cm$^2$ there is no problem in adjusting the sensitivity of the bridge so that the film is advanced only when necessary. In addition it should be noted that once the film is caused to advance due to a temperature rise it does not continue to advance to a second advancement because of the same temperature but is controlled by a change in temperature.

We claim:

1. A mechanism for protection of optical glass plates against high energy laser radiation and absorbing such radiation comprising: a film container including a water impregnated or coated film having one end connected to a supply spool and the opposite end connected to a take-up reel, said container having means for housing said spools and being provided with an opening for said film to extend across; said housing opening and film thereacross being operatively associated with a window; a thermal sensor mounted on said container and disposed close to said window; a resistance bridge and differentiator connected to said thermal sensor; a stepping motor connected to said take-up spool; and a power supply connected to said motor and said bridge to control movement of said take-up spool when actuated by said resistance bridge.

2. A mechanism as set forth in claim 1 including a water reservoir operatively associated with said supply and disposed intermediate said supply and housing opening and wherein said film includes an emulsion to be treated by passing through said water reservoir.

* * * * *